(12) United States Patent
Ishikawa

(10) Patent No.: US 8,194,297 B2
(45) Date of Patent: Jun. 5, 2012

(54) METHOD FOR CONTROLLING LINEAR SENSOR, AND IMAGE READING APPARATUS

(75) Inventor: Shinya Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 12/185,924

(22) Filed: Aug. 5, 2008

(65) Prior Publication Data

US 2009/0040576 A1 Feb. 12, 2009

(30) Foreign Application Priority Data

Aug. 7, 2007 (JP) ................................. 2007-205850
Jul. 29, 2008 (JP) ................................. 2008-195317

(51) Int. Cl.
H04N 1/46 (2006.01)
H04N 1/60 (2006.01)
H04N 3/14 (2006.01)
H04N 5/335 (2011.01)
H01L 27/00 (2006.01)

(52) U.S. Cl. ......... 358/514; 358/1.9; 348/312; 348/294; 250/208.1

(58) Field of Classification Search .................. 358/1.9, 358/505, 509, 513, 533, 474, 475, 482, 483; 348/243, 229.1, 294, 297, 298, 304, 312, 348/314, 303; 250/208.1, 208.3
See application file for complete search history.

(56) References Cited

U.S. PATENT DOCUMENTS

| | | | | |
|---|---|---|---|---|
| 5,227,834 A * | 7/1993 | Ishida et al. | ...................... | 396/96 |
| 5,479,207 A * | 12/1995 | Degi et al. | ...................... | 348/297 |
| 5,703,386 A * | 12/1997 | Yasuda et al. | .................. | 257/230 |
| 5,796,432 A * | 8/1998 | Iesaka et al. | .................. | 348/311 |
| 5,870,178 A * | 2/1999 | Egawa et al. | .................. | 356/3.03 |
| 6,480,228 B1* | 11/2002 | Yoshihara et al. | ............ | 348/312 |
| 6,552,747 B1* | 4/2003 | Hasegawa | ...................... | 348/314 |
| 6,697,175 B1* | 2/2004 | Kumagai et al. | .............. | 358/497 |
| 7,042,503 B2* | 5/2006 | Suzuki | ........................ | 348/229.1 |
| 7,327,500 B2* | 2/2008 | Sakakibara et al. | ........... | 358/483 |
| 7,388,184 B2* | 6/2008 | Izumi et al. | ................. | 250/208.1 |
| 7,511,751 B2* | 3/2009 | Ooba | ............................. | 348/294 |
| 7,535,603 B2* | 5/2009 | Suga | ............................. | 358/474 |
| 7,623,262 B2* | 11/2009 | Kobayashi | ..................... | 358/1.6 |
| 7,893,982 B2* | 2/2011 | Yoshihara et al. | ............ | 348/312 |
| 7,969,623 B2* | 6/2011 | Kagami et al. | ................ | 358/498 |
| 8,022,349 B2* | 9/2011 | Baiko et al. | ................. | 250/208.1 |
| 2003/0210435 A1* | 11/2003 | Tsunai | ............................. | 358/483 |
| 2004/0008387 A1* | 1/2004 | Ikeno | ............................. | 358/505 |
| 2004/0184116 A1* | 9/2004 | Sakakibara et al. | ........... | 358/483 |
| 2004/0195491 A1* | 10/2004 | Machida | ..................... | 250/208.1 |
| 2005/0270590 A1* | 12/2005 | Izumi et al. | ..................... | 358/474 |
| 2007/0064282 A1* | 3/2007 | Kobayashi | ..................... | 358/474 |

FOREIGN PATENT DOCUMENTS

| | | |
|---|---|---|
| JP | 10-170338 A | 6/1998 |
| JP | 2003-153087 A | 5/2003 |
| JP | 2007-074421 A | 3/2007 |

* cited by examiner

*Primary Examiner* — Madelein A Nguyen
(74) *Attorney, Agent, or Firm* — Canon U.S.A., Inc. IP Division

(57) ABSTRACT

A method for controlling a linear sensor comprises: transferring an electric charge converted in a photoelectric conversion unit to a charge storage unit; transferring the electric charge stored in the charge storage unit to a transfer register; driving the transfer register; removing an electric charge stored in the charge storage unit; and controlling to successively execute the first transferring, the second transferring, the driving and the removing in synchronization with a trigger signal generated on a predetermined cycle.

10 Claims, 14 Drawing Sheets

F I G. 10
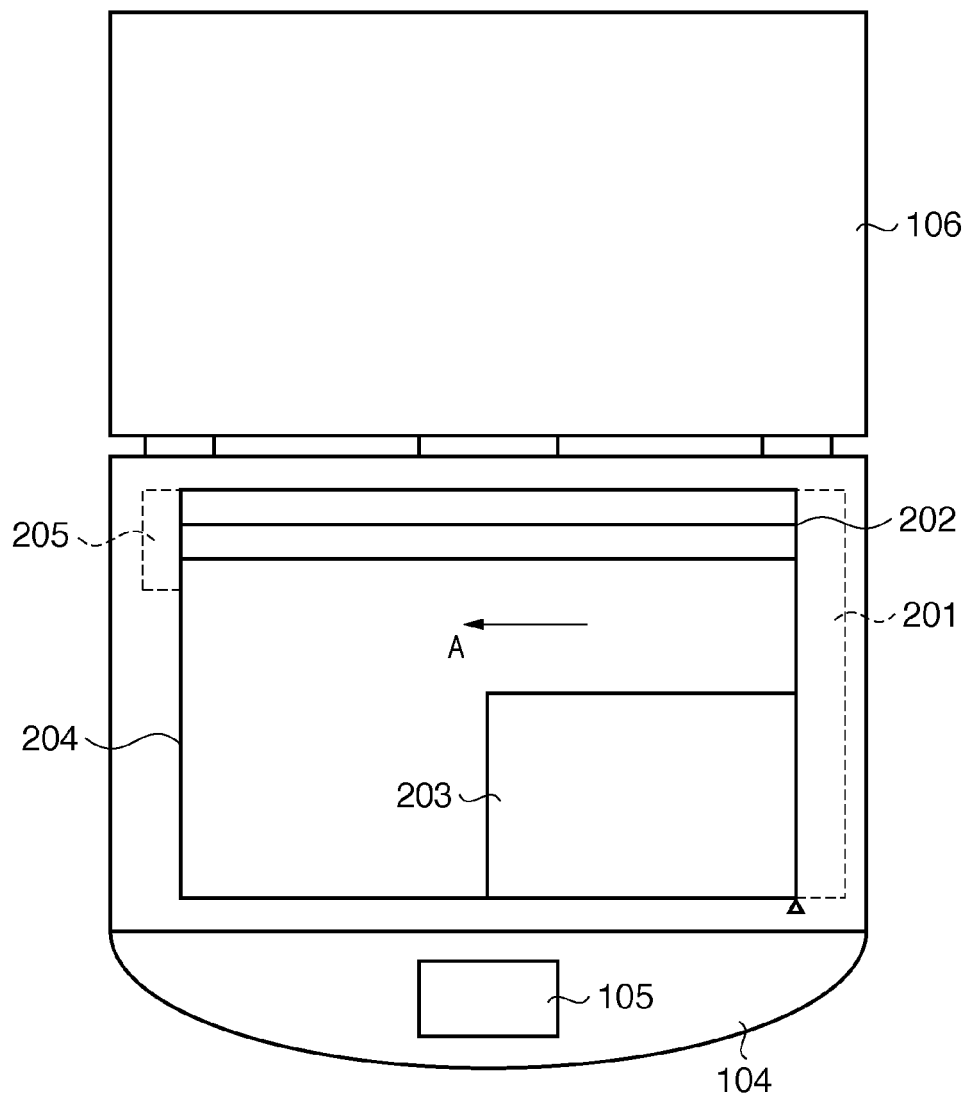

METHOD FOR CONTROLLING LINEAR SENSOR, AND IMAGE READING APPARATUS

BACKGROUND OF THE INVENTION

1. Field of the Invention

The present invention relates to a method for controlling a linear sensor for use in an image reading apparatus such as a facsimile, an image scanner, or the like, and to an image reading apparatus provided with a linear sensor.

2. Description of the Related Art

Conventional use of a solid-state linear sensor in an image reading apparatus is well-known. A CCD linear sensor is a typical example of such a solid-state linear sensor.

FIG. 7 is a schematic drawing showing a configuration of a common CCD linear sensor. In the drawing, reference numbers 71a, 71b, 71c, 71d and so on up to 71xx refer to photoelectric conversion elements composed of, for example, photo diodes. A photoelectric conversion unit 71 is configured by linearly arranging the photoelectric conversion elements 71a, 71b, 71c, 71d and so on up to 71xx. The photoelectric conversion elements 71a, 71b, 71c, 71d and so on up to 71xx all accumulate electric charges obtained by the photoelectric conversion of incident light. Reference number 72 refers to a transfer gate that transfers the electric charges accumulated in the photoelectric conversion unit 71. Reference numbers 73a, 73b, 73c, 73d and so on up to 73xx refer to CCD registers that transfer, in sequence, the electric charges transferred from each of the photoelectric conversion elements 71a, 71b, 71c, 71d and so on up to 71xx. The CCD registers form a transfer unit 73. Reference number 74 refers to an output circuit that outputs, as output signals, the electric charges transferred from the transfer unit 73.

It is known that, in such a CCD linear sensor, a noise, that is, dark current noise, is generated even in a state in which no light is incident on the photoelectric conversion unit 71. The dark current noise is noise resulting from the generated dark current. The dark current can be described in other terms as an electric charge that is generated in a state in which no light is incident on the photoelectric conversion unit 71. Moreover, it is a well-known fact that the dark current noise nearly doubles when the temperature rises by 8 to 10° C., and that the dark current noise is substantially proportional to the time of electric charge accumulation in the photoelectric conversion unit 71 and the transfer unit 73.

Examples of methods for removing dark current noise are subtracting the part of the signal arising as a result of the dark current from the output signal obtained by photoelectric conversion in the photoelectric conversion unit (see Japanese Patent Laid-Open No. H10-170338), and changing the electric field near the transfer unit by controlling a transfer clock signal, thereby inhibiting the flow of unnecessary electric charges from P-well regions into the transfer unit (see Japanese Patent Laid-Open No. 2003-153087).

A high resolution is required in linear sensors of recent years when linear sensors are used in a high resolution mode, and a high speed is required when linear sensors are used in a low resolution mode. To meet these requirements, a CCD linear sensor provided with a charge accumulation (storage) unit between a photoelectric conversion unit and a transfer unit has been disclosed (see Japanese Patent Laid-Open No. 2007-74421).

FIG. 8 is a schematic drawing showing a configuration of a CCD linear sensor provided with a charge accumulation unit between a photoelectric conversion unit and a transfer unit. In the drawing, reference numbers 81a, 81b, 81c, 81d and so on up to 81xx refer to photoelectric conversion elements composed of, for example, photo diodes. A photoelectric conversion unit 81 is formed by linearly arranging the photoelectric conversion elements 81a, 81b, 81c, 81d and so on up to 81xx. The photoelectric conversion elements 81a, 81b, 81c, 81d and so on up to 81xx all accumulate electric charges obtained by the photoelectric conversion of incident light. Reference number 82 refers to a transfer gate that transfers the electric charges accumulated in each photoelectric conversion element. Reference numbers 83a, 83b, 83c, 83d and so on up to 83xx refer to charge accumulation (storage) elements that accumulate the electric charges transferred from each of the photoelectric conversion elements 81a, 81b, 81c, 81d and so on up to 81xx, and the charge accumulation elements form a charge accumulation (storage) unit 83. The charge accumulation unit 83 is arranged in a linear manner in parallel with the photoelectric conversion unit 81. Reference number 84 refers to a transfer gate that transfers the electric charges accumulated in the charge accumulation unit 83. Reference numbers 85a, 85b, 85c, 85d and so on up to 85xx refer to CCD registers that transfer, in sequence, the electric charges transferred from the charge accumulation unit 83, and the CCD registers form a transfer unit 85. Reference number 86 refers to an output circuit that outputs the electric charges transferred from the transfer unit 85 as a line signal.

In a CCD linear sensor provided with such a charge accumulation unit 83, in addition to a commonly-generated dark current noise, a dark current noise that fluctuates on the time scale of several milliseconds to several seconds (hereinafter, a variable dark current noise) is generated in the charge accumulation unit 83 due to the influence of the dark current. The variable dark current noise changes according to the condition of the substrate on which a charge accumulation unit is provided, and has a two- to multiple-stage state. The variable dark current noise in respective states is substantially proportional to the temperature and the accumulation time, as with the dark current noise of a CCD linear sensor in which no charge accumulation unit is provided. Although the frequency of fluctuation of the variable dark current noise is dependent on the temperature, it is very difficult to estimate the frequency of occurrence and to estimate in which elements the noise occurs. Therefore, a method for preventing the deterioration of the accuracy of image reading due to the influence of the variable dark current noise is needed.

However, since conventional methods do not address any variable dark current noise, there is a problem that a precise correction cannot be performed with respect to the variable dark current noise.

Moreover, there is a problem that when the amount of dark current noise is large, it is difficult to completely prevent the unnecessary electric charges from entering into the transfer unit just by changing the electric field near P-well regions.

SUMMARY OF THE INVENTION

The present invention provides a linear sensor control method that can reduce any dark current noise including variable dark current noise. Moreover, the present invention provides an image reading apparatus provided with a linear sensor, the apparatus being able to reduce the dark current noise of the linear sensor.

One aspect of the present invention provides a method for controlling a linear sensor having a photoelectric conversion unit that converts received light into an electric charge, a charge storage unit that stores the electric charge transferred from the photoelectric conversion unit, and a transfer register that transfers the retained electric charge, the method comprises: transferring the electric charge converted in the photoelectric conversion unit to the charge storage unit; transferring the electric charge stored in the charge storage unit to the transfer register; driving the transfer register; removing an electric charge stored in the charge storage unit; and controlling to successively execute the first transferring, the second transferring, the driving and the removing in synchronization with a trigger signal generated on a predetermined cycle.

Another aspect of the present invention provides a method for controlling an image reading apparatus using a linear sensor having a photoelectric conversion unit that converts received light into an electric charge, a charge storage unit that stores the electric charge transferred from the photoelectric conversion unit, and a transfer register that transfers the retained electric charge, the method comprises: transferring the electric charge converted in the photoelectric conversion unit to the charge storage unit; transferring the electric charge stored in the charge storage unit to the transfer register; storing a signal outputted from the linear sensor via the transfer register in a memory unit provided in the image reading apparatus; disposing of a signal outputted from the linear sensor via the transfer register without storing the signal in a memory unit provided in the image reading apparatus; and controlling to successively execute the first transferring, the second transferring, the storing, the second transferring and the disposing in synchronization with a trigger signal generated on a predetermined cycle.

Still another aspect of the present invention provides a control apparatus for a linear sensor having a light irradiation unit that irradiates an original with light, a photoelectric conversion unit that receives light irradiated by the light irradiation unit and reflected by the original and that converts the light into an electric charge, a charge storage unit that stores the electric charge transferred from the photoelectric conversion unit, and a transfer register that transfers the electric charge retained therein, the apparatus comprises: a first transfer unit that transfers the electric charge converted in the photoelectric conversion unit to the charge storage unit; a second transfer unit that transfers the electric charge stored in the charge storage unit to the transfer register; a drive unit that drives the transfer register; and a control unit that causes respective operations of the first transfer unit, the second transfer unit, the drive unit, the second transfer unit and the drive unit to be successively executed in synchronization with a trigger signal generated on a predetermined cycle.

Further features of the present invention will be apparent from the following description of exemplary embodiments with reference to the attached drawings.

BRIEF DESCRIPTION OF THE DRAWINGS

FIG. 10 is a top view showing a configuration of the scanner unit of the multifunction printer shown in FIG. 9.

DESCRIPTION OF THE EMBODIMENTS

Various embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

In the present specification, the term "to record" (hereinafter sometimes referred to as "to print") is used to broadly express when not only a text, a figure, or like information expressing a certain meaning but also when an image, a design, a pattern, or the like, which may or may not have a specific meaning, is formed on a print medium, or when processing is performed on a medium. Moreover, this applies regardless of whether or not such information is made apparent in a manner in which a person can visually perceive the information.

Furthermore, the term "print medium" refers to not only paper used with common printing apparatuses, but also broadly to cloth, plastic film, metal plates, glass, ceramics, wood, leather, and similar media that can receive inks.

In addition, the term "ink" should be broadly interpreted as with the definition of "to record" described above, and refers to fluid that is employed in the formation of images, designs, patters or the like, processing of print media, or ink processing, by being applied to the print media. Examples of ink processing include solidifying or insolubilizing the coloring materials contained in the ink applied to a print medium.

Figure 9:
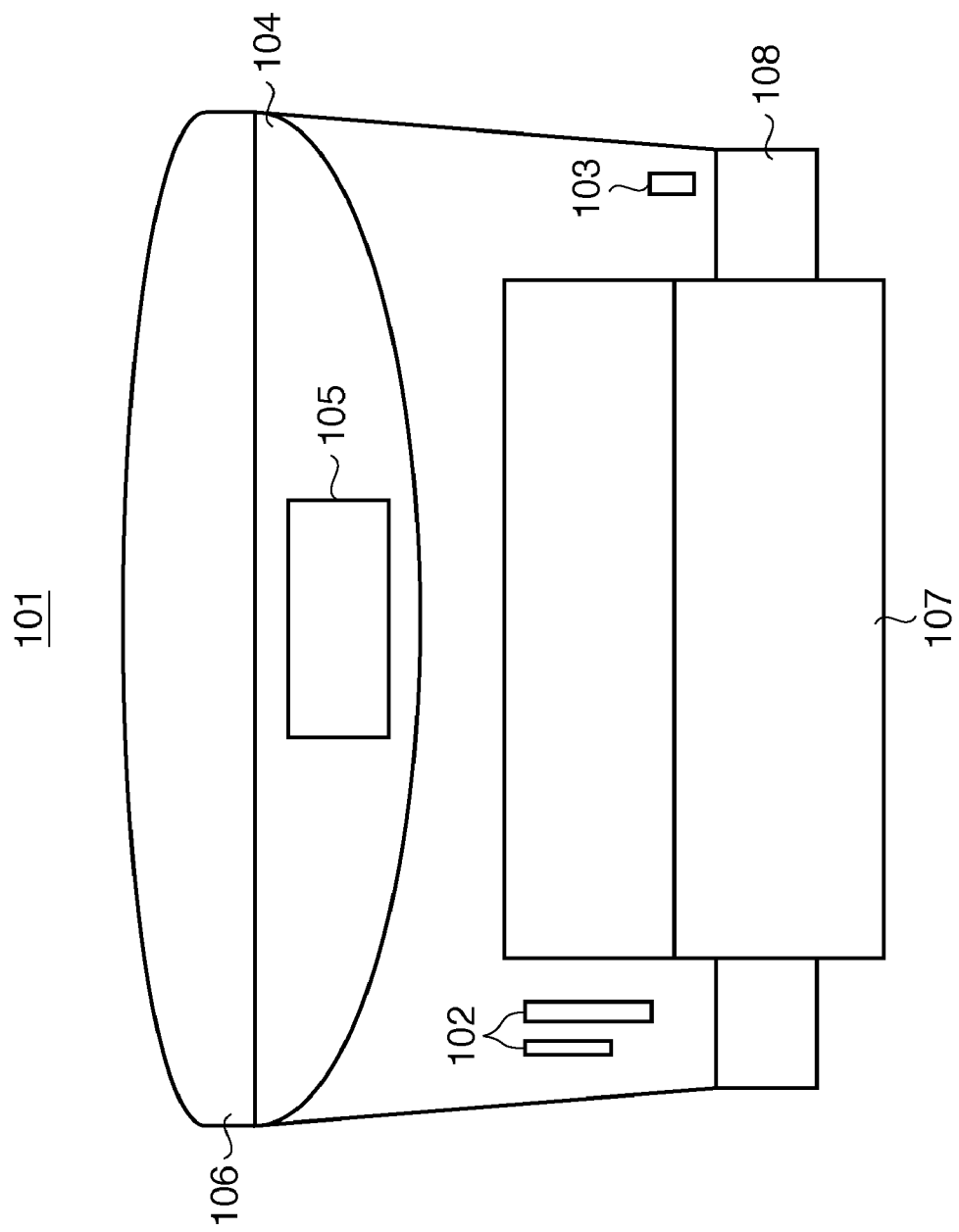
FIG. 9 is a front view of a multifunction printer, provided with a print unit that has an ink-jet printhead and a scanner unit that optically reads an image, according to a representative embodiment of the present invention.

FIG. 9 is a front view of the exterior of a multifunction printer (hereinafter, MFP) 101 that is an image reading apparatus provided with a linear sensor according to a representative embodiment of the present invention. The MFP 101 is composed primarily of a print unit and a scanner unit. An ink-jet serial printer is housed in the print unit, and a flatbed scanner provided with a CCD linear sensor is housed in the scanner unit. Structurally, the scanner unit is disposed on top of the print unit. A top cover 106 is provided in the scanner unit for pressing down an original. The top cover 106 is rotatable by hinges (not shown). On the other hand, the print unit is provided with a paper discharge unit 107 that discharges a print medium out of the MFP 101 after printing, and a paper feed unit 108 on which a print medium such as print paper for use in printing is placed.

In addition, memory card slots 102 for the input and output of information between the MFP 101 and memory cards used in digital cameras and the like are disposed on the front left side of the MFP 101. Since there are various types of memory cards, two kinds of memory card slots 102 are provided to receive memory cards of different types. Moreover, an external device connecting terminal 103 is provided on the front right side of the MFP 101 for connection with external storages such as digital cameras, DVD/CD-ROM drives, removable HDDs, etc. The external device connecting terminal 103 is a USB terminal.

Furthermore, on the front upper side of the MFP 101 is provided an operational unit 104 furnished with a plurality of manual operation buttons to operate the MFP 101. In the center of the operational unit 104 is provided a color LCD 105 that displays menus and images.

As described above, because the MFP 101 is provided with the memory card slots 102 and the external device connecting terminal 103 in addition to the print unit and the scanner unit, the MFP 101 can perform copying and printing of the images stored in a memory card without being connected to a host apparatus such as a personal computer (PC). Moreover, due to the color LCD 105, the images read by the scanner unit and the images stored in a memory card can be previewed.

Next, the scanner unit of the MFP 101 shall be described. FIG. 10 is a top view of the MFP 101. As shown in FIG. 10, when the top cover 106 is lifted up, the configuration of the scanner unit can be seen. The scanner unit is composed primarily of a scanner carriage 201, a shaft 202, a glass 204 on which an original 203 is placed, and a scanner carriage motor 205 to move the scanner carriage 201. The scanner carriage 201 is composed of a light source, a mirror, a lens, a CCD linear sensor and the like. The scanner carriage 201 moves on the shaft 202 in the direction indicated by arrow A and optically reads the image of the original 203.

When the image of the original 203 is read, the top cover 106 of the MFP 101 is lifted up, the original 203, which is the target to be read, is placed on the glass 204, the top cover 106 is lowered, and instructions for reading are given to the MFP by operating the operational unit 104.

Figure 11:
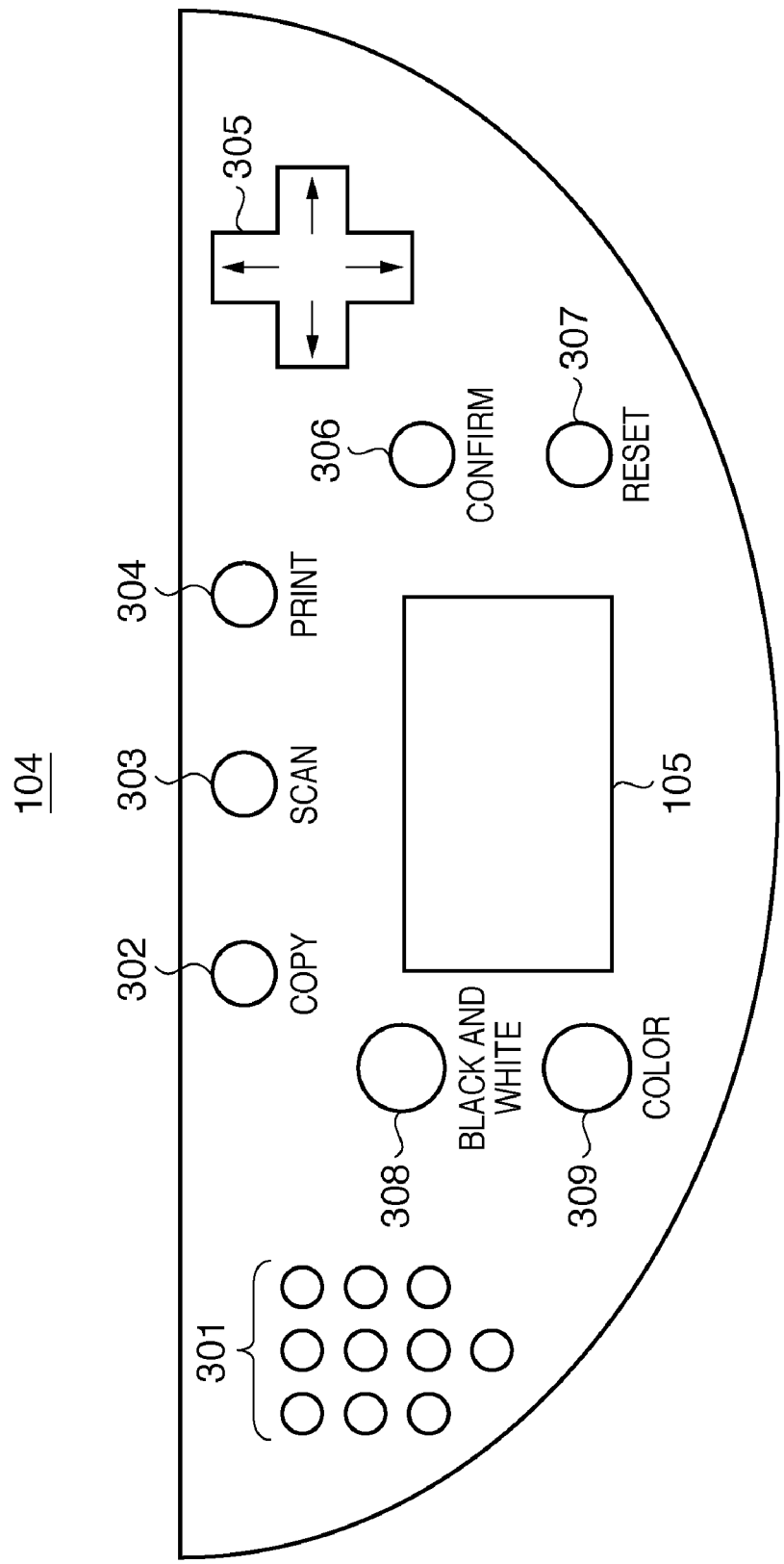
FIG. 11 is a drawing showing a configuration of the operational unit of the multifunction printer shown in FIG. 9.

FIG. 11 shows a drawing showing a layout of the operational unit 104. In reading the original, an operator presses a scan button 303. When the scan button 303 is pressed by the user, the light source in the scanner carriage 201 lights up, and the scanner carriage 201 moves in the direction indicated by arrow A along the shaft 202. At that time, the light source (not shown) irradiates the original 203, the amount of light reflected therefrom is read by a CCD through the mirror and the lens in the scanner carriage, and the light is converted into an electric signal and stored in the memory as image data.

As shown in FIG. 11, various buttons and keys are provided on the operational unit 104. These include, for example, a ten-key numerical key pad 301, a copy button 302, the scan button 303, a print button 304 and a cursor key 305. Moreover, a confirmation button 306 to confirm input instructions, a reset button 307 to cancel input instructions, a black and white processing instruction button 308, a color processing instruction button 309, and so on are provided. In addition to these, although not shown, switches for application of power and for being on-line/off-line with a host apparatus, and like components are provided. The operational status, images stored in a RAM 513 or memory card 515, and menus are displayed on the color LCD 105.

Figure 12:
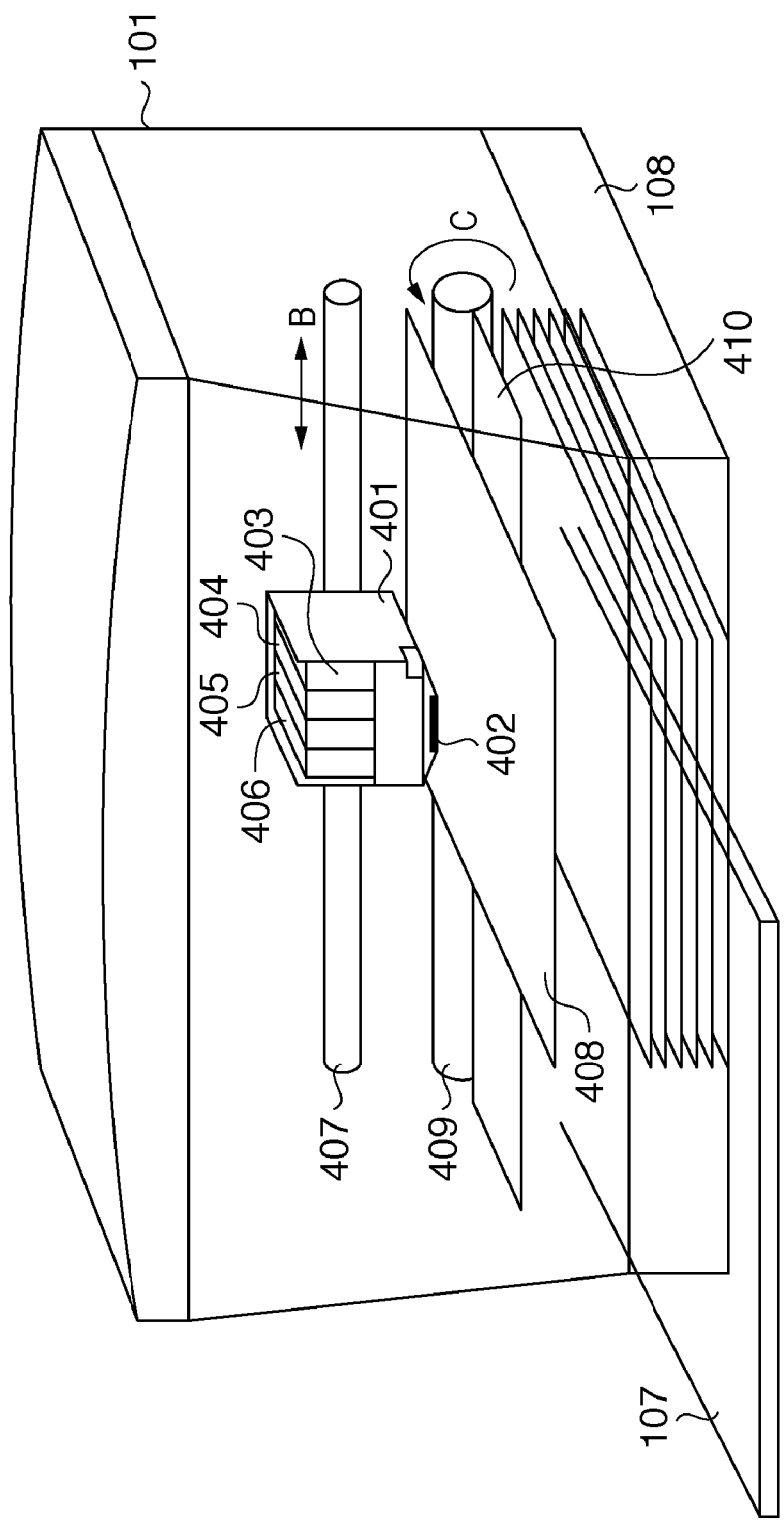
FIG. 12 is a perspective view showing a configuration of the print unit of the multifunction printer shown in FIG. 9.

Next, the print unit of the MFP 101 shall be described. FIG. 12 is a perspective drawing showing an outline of a configuration of the print unit of the MFP 101.

As shown in FIG. 12, the print unit is composed primarily of a head carriage 401, a printhead 402, ink tanks 403 to 406, a shaft 407, a transportation roller 409, a platen 410, a head carriage motor (not shown), and a transportation motor (not shown).

The head carriage 401 accommodates the printhead 402, the ink tank 403 containing a black ink, the ink tank 404 containing a cyan ink, the ink tank 405 containing a magenta ink, and the ink tank 406 containing a yellow ink. The head carriage 401 carries out printing by discharging ink drops onto print paper 408 while moving in the direction indicated by arrow B along the shaft 407 that supports the head carriage 401.

In a print operation, the top sheet of the print paper 408 housed in the paper feed unit 108 is drawn in a U-shaped manner as indicated by arrow C using the transportation roller 409 and the drive motor. At the same time that the tip of the print paper 408 reaches beneath the print head 402, the head carriage 401 moves in a reciprocating manner in the directions indicated by arrows B, and printing for one pass is carried out by discharging ink drops from the printhead 402 onto the print paper 408. Then, the print paper 408 is fed a distance corresponding to one pass by the transportation roller 409, and the head carriage 401 passes again, thereby carrying out printing. This operation is repeated, and after printing is complete, the print paper 408 is discharged onto the paper discharge unit 107, thereby completing the print operation.

In particular, when copy printing of the image printed on the print paper is carried out, the original 203 is placed on the glass 204 as shown in FIG. 10, the top cover 106 is lowered, and the copy button 302 of the operational unit 104 shown in FIG. 11 is pressed. According to this instruction, image data is stored in the memory in the same manner as in the image reading operation described above. Then, the temporarily-stored image data is converted into print data, printing is carried out in the print unit, and a copy image is output.

Figure 13:
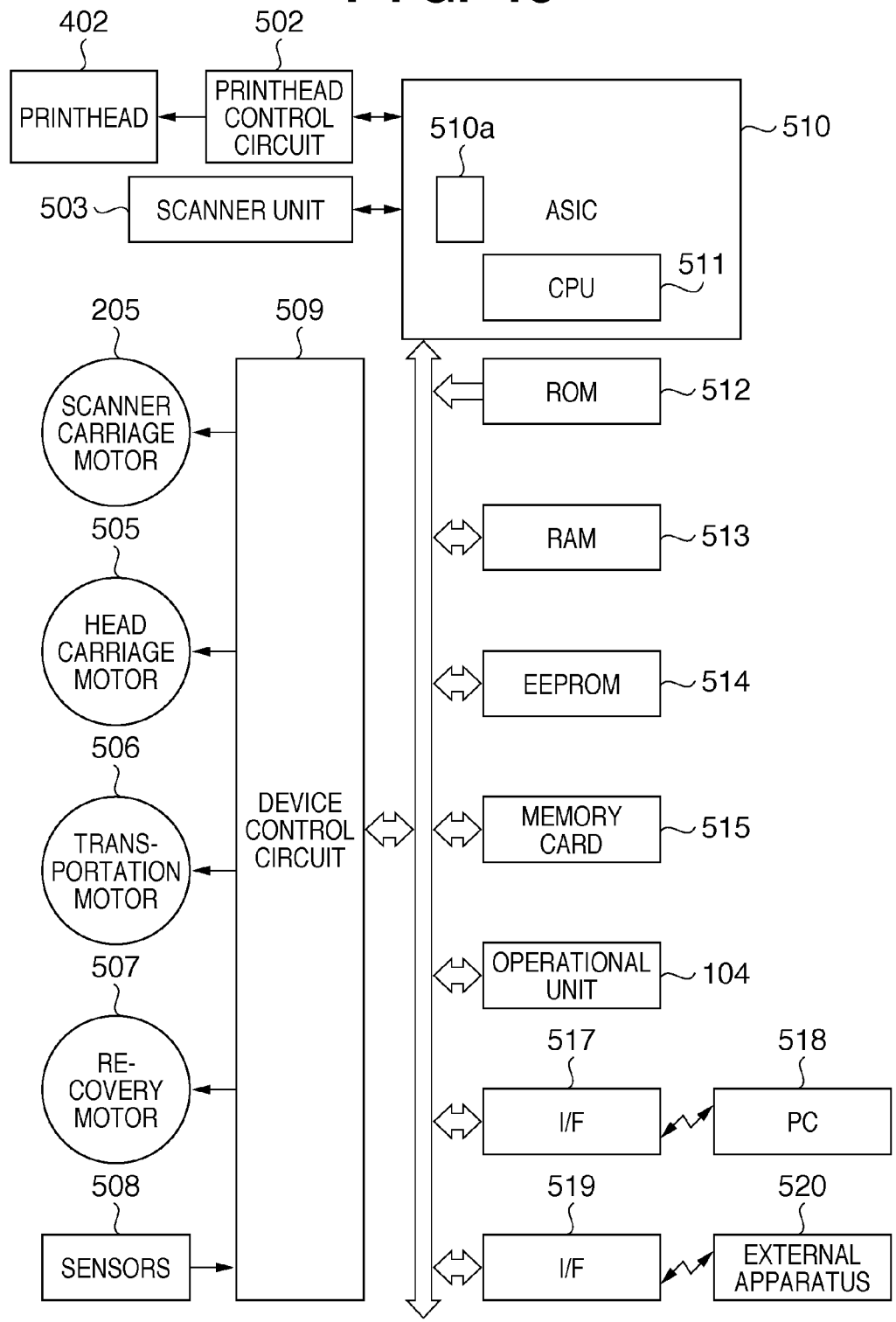
FIG. 13 is a block diagram showing a control configuration of the multifunction printer shown in FIG. 9.

FIG. 13 is a block diagram showing a control configuration of the MFP 101 shown in FIG. 9. In FIG. 13, the same reference numbers are given to the same components that have already been described, and descriptions thereof are omitted.

In FIG. 13, reference number 502 refers to a printhead control circuit that generates a drive pulse for electrically controlling the printhead 402 and causing the inks to be discharged based on image data. Reference number 503 refers to a scanner unit that optically reads an image, reference number 505 refers to the head carriage motor that moves the head carriage 401, and reference number 506 refers to the transportation motor that feeds a print medium. Reference number 507 refers to a recovery motor that drives a pump for clearing nozzle clogs and so on in the printhead 402. Reference number 508 refers to sensors for monitoring the status of operation of the print unit and the scanner unit. Reference number 509 refers to a device control circuit that controls and manages various motors and the sensors. The scanner unit 503 is provided with a CCD linear sensor and an A/D conversion unit (not shown).

Reference number 510 refers to an ASIC including a CPU 511 that controls the overall operation of each unit, and reference number 512 refers to a ROM in which programs corresponding to the processing procedures executed by the ASIC 510 are stored. Reference number 513 refers to a RAM in which a parameter and image data for the ASIC 510 to execute the processing procedures are temporarily stored, reference number 514 refers to an EEPROM that stores the status of the printhead 402 even when the MFP 101 is powered off, and reference number 515 is a memory card in which image data is mainly stored with digital cameras and the like.

Reference number 510a is a read control unit. This read control unit 510a controls the drive of the CCD linear sensor and the A/D conversion unit.

Furthermore, reference numbers 517 and 519 are interfaces (I/F) with external apparatuses. A personal computer (PC) 518 is connected via the interface 517 and an external apparatus 520 such as a digital camera, an optical disk or the like is connected via the interface 519, all through cables. Via the interfaces 517 and 519, the input and output of image data are carried out between the MFP 101 and the external apparatuses.

First Exemplary Embodiment

Figure 1:
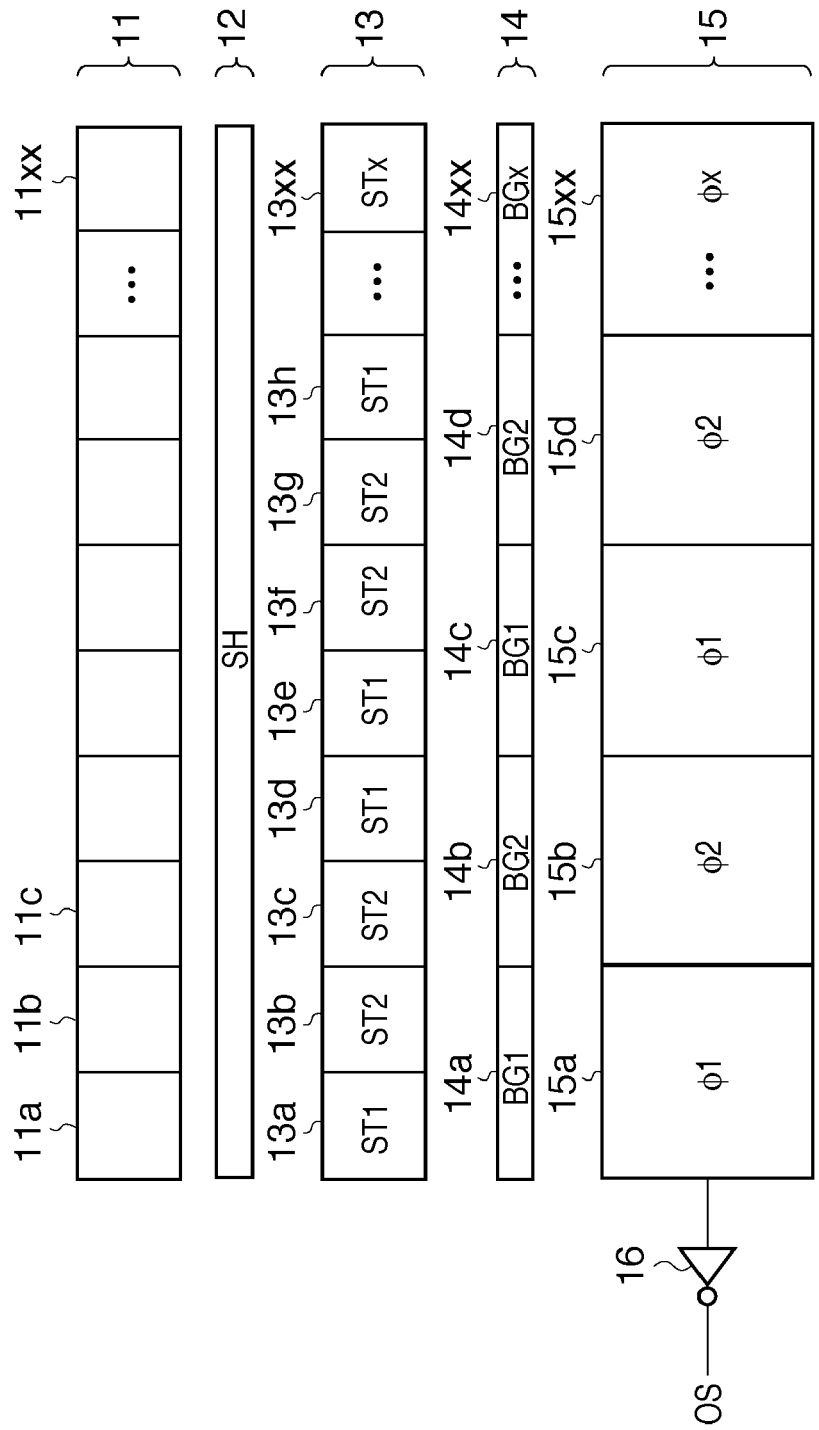
FIG. 1 is a drawing showing an example CCD linear sensor according to a first exemplary embodiment of the present invention (referred to as "Embodiment 1").

A CCD linear sensor according to the present embodiment is shown in FIG. 1. As shown in FIG. 1, the CCD linear sensor according to the present embodiment is provided with a photoelectric conversion unit 11 that converts received light into an electric charge, a transfer gate 12, a charge accumulation (storage) unit 13, a barrier gate 14 and a transfer register (transfer unit) 15. The photoelectric conversion unit 11 is composed of a plurality of photoelectric conversion elements 11a, 11b and so on up to 11xx that are arranged in a specific direction and that generate signal electric charges by photoelectric conversion. The charge accumulation unit 13 is composed of a plurality of charge accumulation (storage) elements 13a, 13b and so on up to 13xx that are arranged in parallel with the photoelectric conversion unit 11 and that accumulate the signal electric charges. The barrier gate 14 (14a~14xx) in a low resolution mode combines signal electric charges for at least every two charge accumulation elements of all the charge accumulation elements 13a, 13b and so on up to 13xx of the charge accumulation unit 13, and transfers the combined signal electric charges to the transfer register 15. Here, the term "low resolution" means resolutions ½n (where n is a whole number of 1 or greater) such as ½ and ¼ of the resolution of the photoelectric conversion unit 11. Reference numbers 15a, 15b, 15c, 15d and so on up to 15xx refer to CCD registers that transfer in sequence the electric charges transferred from the charge accumulation unit 13, and form the transfer registers (transfer unit) 15. Reference number 16 refers to an output circuit that outputs the electric charges transferred from the transfer registers 15 to the A/D conversion unit.

Figure 2:
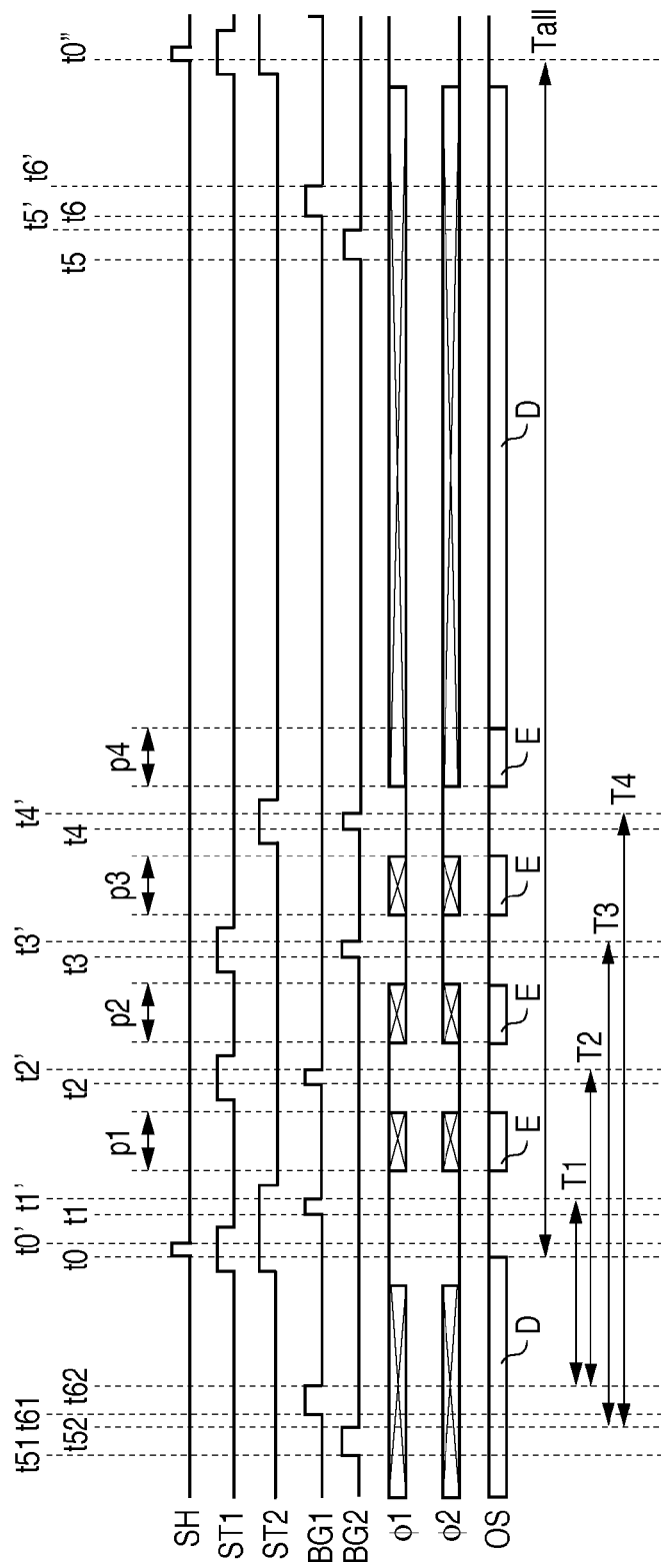
FIG. 2 is a time chart showing an example of the operation of a CCD linear sensor of Embodiment 1.

Here, with reference to the time chart shown in FIG. 2, a method of reducing a dark current noise according to the present embodiment is described. All the signal names given in FIG. 2 match the letters given in each block shown in FIG. 1, and those signals are applied to the respective blocks. OS in FIG. 2 indicates a signal applied to the output circuit that outputs the electric charges forwarded from the transfer register 15 as image signals, and indicates that effective pixels are forwarded at times E in the chart. The read control unit 510a (see FIG. 13) performs processing by inputting a signal from the scanner unit 503. The read control unit 510a performs accumulation in the memory and image processing with respect to, for example, the signal (data) outputted at times E in FIG. 2. On the other hand, the read control unit 510a performs disposal (abandonment) processing without accumulation (storing) in the memory with respect to, for example, the signal (data) output at times D.

The read control unit 510a (see FIG. 13) outputs each of the signals SH, ST1, ST2, BG1, BG2, Φ1 and Φ2 (see FIG. 2), which shall be described below, at predetermined times. Based on these signals, processing in which electric charges are transferred and in which signal electric charges that have undergone a photoelectric conversion in the photoelectric conversion unit 11 are transferred to the ASIC 510 under the control of the read control unit 510a is performed cyclically.

Furthermore, processing in which electric charges generated in the charge accumulation unit 13 between the previous electric charge transfer processing and the next electric charge transfer processing are transferred to the ASIC 510 is performed. This transfer processing of the electric charges generated in the charge accumulation unit 13 is performed at a predetermined time after the previous signal electric charge transfer processing is carried out.

By setting the transfer gate 12 (SH) to a high (H) level in period t0-t0' where ST1 and ST2 are in a state of being set to a H level, the electric charge of each photoelectric conversion element accumulated in the photoelectric conversion unit 11 of FIG. 1 is transferred to each corresponding charge accumulation element of the charge accumulation unit 13. Since SH is in a low (L) level from t0' to t0", the electric charges generated in the photoelectric conversion unit 11 in this period are all accumulated in the photoelectric conversion unit 11. Moreover, the electric charges transferred to the charge accumulation unit 13 are transferred in sequence to the transfer register 15 in a manner as described below.

First, in period t1-t1' where ST1 is in a state of being set to a L level and ST2 is in a state of being set to a H level, BG1 is set to a H level, and thus the electric charges of the charge accumulation elements 13a, 13e and so on of ST1 corresponding to BG1 of the barrier gate 14 are transferred to the transfer register 15. Then, by driving the transfer register 15 in period p1, the electric charges are output in sequence as signal electric charges from the transfer register 15 via the output circuit 16. Next, in period t2-t2' where ST1 is in a state of being set to a H level and ST2 is in a state of being set to a L level, BG1 is set to a H level, and the electric charges of the charge accumulation elements 13b, 13f and so on of ST2 corresponding to BG1 of the barrier gate 14 are transferred to the transfer register 15. Then, the electric charges are output as signal electric charges from the transfer register 15 in period p2. Next, in period t3-t3' where ST1 is in a state of being set to a H level and ST2 is in a state of being set to a L level, BG2 is set to a H level, and the electric charges of the charge accumulation elements 13c, 13g and so on of ST2 corresponding to BG2 of the barrier gate 14 are transferred to the transfer register 15. Then, the electric charges are output as signal electric charges from the transfer register 15 in period p3. Next, in period t4-t4' where ST1 is in a state of being set to a H level and ST2 is in a state of being set to a L level, BG2 is set to a H level, and the electric charges of the charge accumulation elements 13d, 13h and so on of ST2 corresponding to BG2 of the barrier gate 14 are transferred to the transfer register 15. Then, the electric charges are outputted as signal electric charges from the transfer register 15 in period p4.

When ordinary image reading is carried out, images are read by repeating the above-described procedure. In the present embodiment, in periods t5-t5' and t6-t6', both BG2 and BG1 are set to a H level, respectively, and both ST1 and ST2 in these periods are set to a L level. Due to this control, the electric charges generated in the charge accumulation elements 13a, 13b, 13e and 13f corresponding to BG1 of the barrier gate 14 are transferred to the transfer register 15 in period t5-t5'. In period t6-t6' the electric charges generated in the charge accumulation elements 13c, 13d, 13g and 13h corresponding to BG2 of the barrier gate 14 are transferred to the transfer register 15. Then, in period D including t5-t0", the transfer register 15 is driven. By performing such control, the electric charges unrelated to the read image accumulated in the charge accumulation elements are transferred to the transfer register 15, so it is possible remove the influence of the noise created by a dark current. At this time, period t6'-t0"

needs to have a sufficient time to allow all the electric charges transferred to the transfer register 15 to be output. Therefore, the durations of period t5-t5' and period t6-t6' are determined based on the operating time of the transfer register 15. The drive of the transfer register 15 may be either stopped or not stopped, and either may be performed as long as a time that is sufficient for the transfer of the electric charges from the charge accumulation unit 13 can be secured.

Still referring to FIG. 2, the following processing is performed before starting reading an image. The same processing as in period t5-t5' is performed in period t51-t52. In addition, the same processing as in period t6-t6' is performed in period t61-t62. Thereby, the unnecessary electric charges accumulated in the charge accumulation elements can be removed prior to starting a reading operation.

A time when a dark current can be generated in each charge accumulation element was substantially identical to the accumulation time Tall for one line when no electric charge transfer processing was performed in periods t5-t5' and t6-t6'. In contrast, when electric charge transfer processing was performed in periods t5-t5' and t6-t6', the time can be shortened to T1 in the charge accumulation element of ST1 corresponding to BG1, T2 in the charge accumulation element of ST2 corresponding to BG1, T3 in the charge accumulation element of ST2 corresponding to BG2, and T4 in the charge accumulation element of ST1 corresponding to BG2. The amount of dark current noise is substantially proportional to the accumulation time. Therefore, the disposal control can be more effective by setting periods t0'-t1, t1'-t2, t2'-t3, t3'-t4, t62-t1, t62-t2, t52-t3 and t52-t4 to be as long as is necessary while also being as short as possible.

When electric charge transfer processing as described above is performed, the durations of T3 and T4 are longer than T1 and T2. Therefore, the amount of unnecessary electric charge superimposed on the signal electric charges output in the second half is larger than the amount of unnecessary electric charge superimposed on the signal electric charges outputted in the first half. In order to make the amount of unnecessary electric charge superimposed on the signal electric charges output in the second half close to the amount of unnecessary electric charge superimposed on the signal electric charges output in the first half, the electric charge transfer processing is controlled as shown in the time chart of FIG. 3, and thus it is possible to further reduce dark current noise.

Figure 3:
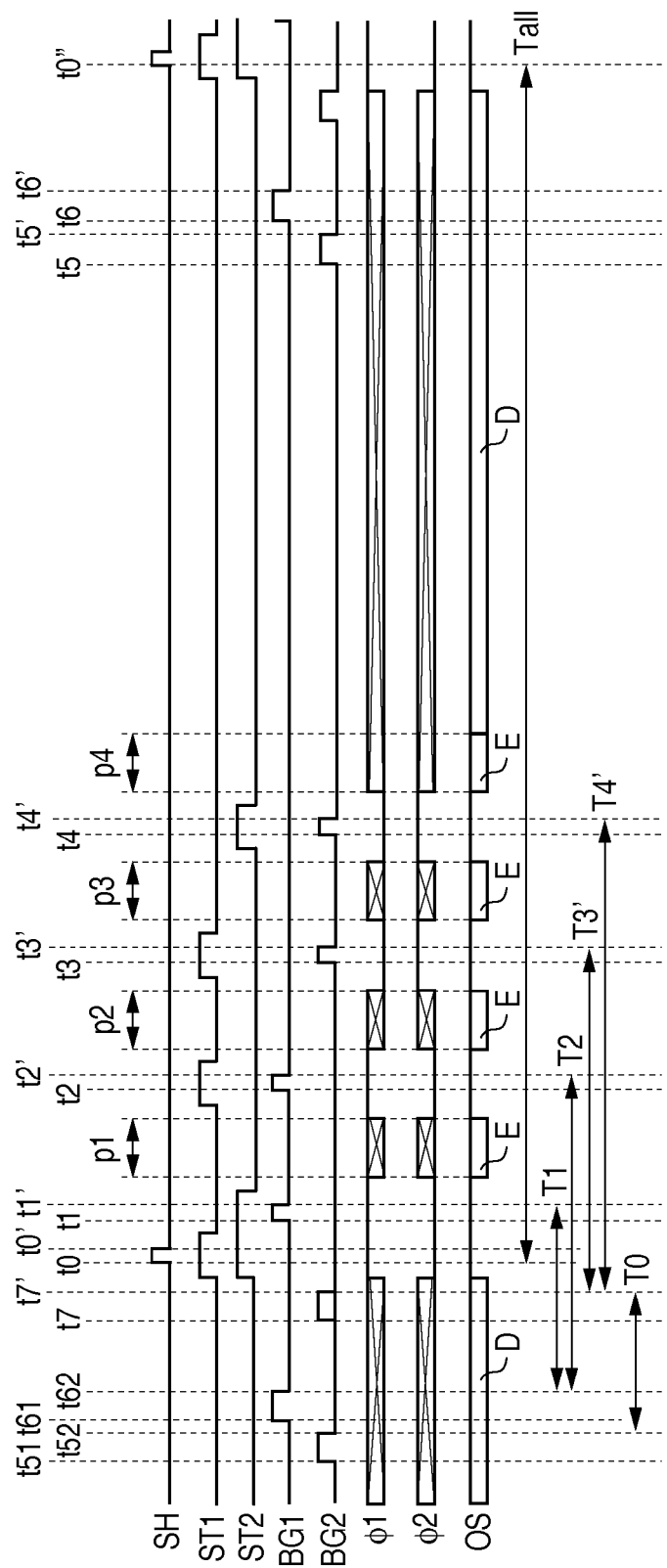
FIG. 3 shows an application example of a time chart showing an example of the operation of a CCD linear sensor of Embodiment 1.

As shown in the time chart of FIG. 3, by setting ST1 to a L level, ST2 to a L level, and BG2 to a H level in period t7-t7', the electric charges of the charge accumulation elements of ST1 and ST2 corresponding to BG2 are transferred to the transfer register 15 and output as signal electric charges. Thereby, the unnecessary electric charges of the charge accumulation elements of ST1 and ST2 corresponding to BG2 can be reduced. Moreover, the durations of time T3 and T4 which the dark current noise in connection with the charge accumulation elements of ST1 and ST2 corresponding to BG2 influences can be shortened. Hence, the unnecessary electric charges due to the influence of dark current noise on the charge accumulation unit 13 accumulated after performing the disposal processing are distributed substantially uniformly within the effective signals.

Second Exemplary Embodiment

Figure 4:
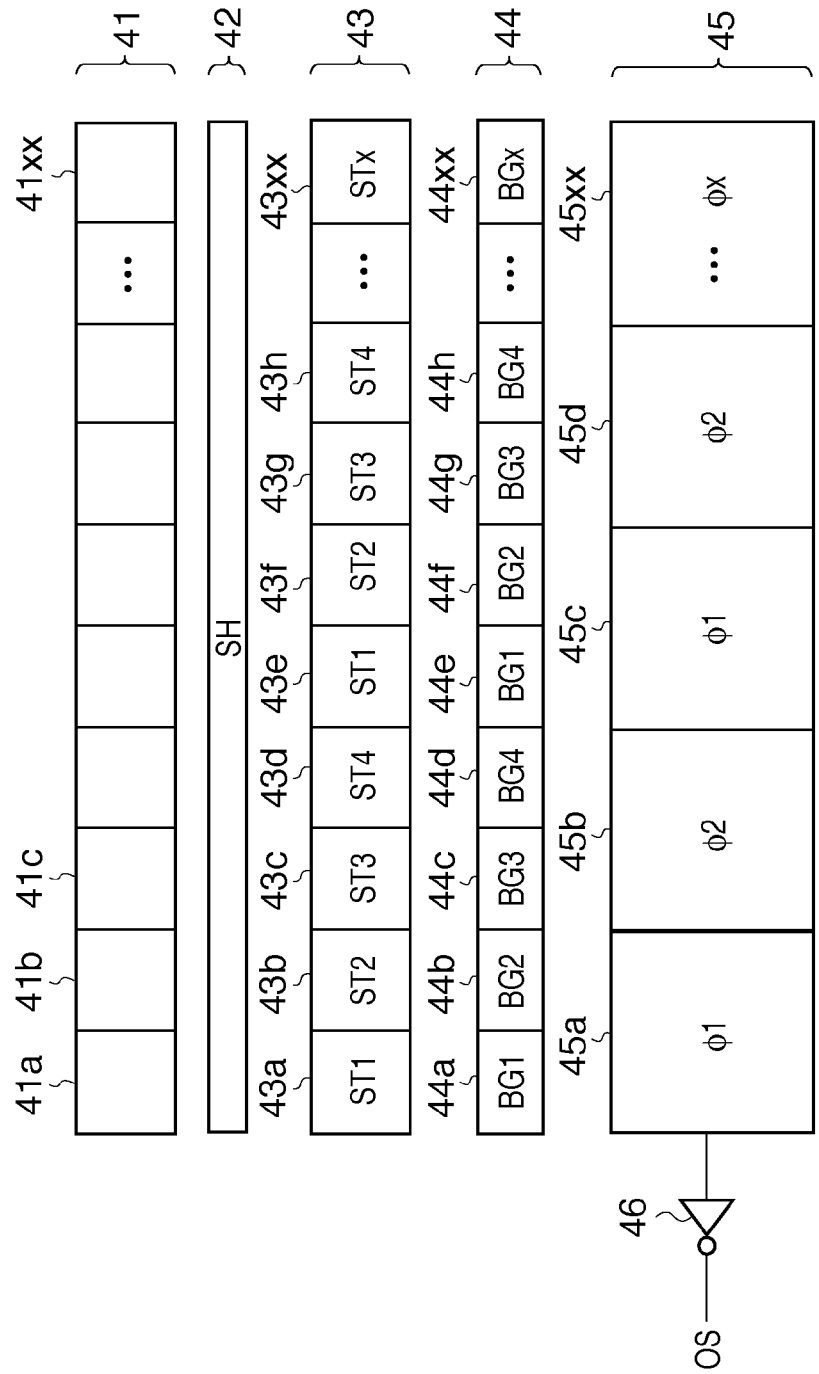
FIG. 4 is a drawing showing a CCD linear sensor according to a second exemplary embodiment of the present invention (referred to as "Embodiment 2").

A CCD linear sensor according to the present embodiment is shown in FIG. 4. As shown in FIG. 4, a CCD linear sensor according to the present embodiment is, as with the CCD linear sensor of FIG. 1, provided with a photoelectric conversion unit 41, a transfer gate 42, a charge accumulation unit 43, a barrier gate 44 and a transfer register 45. The photoelectric conversion unit 41 is composed of a plurality of photoelectric conversion elements 41a, 41b and so on up to 41xx that are arranged in a specific direction and generate signal electric charges by photoelectric conversion. The charge accumulation unit 43 is composed of a plurality of charge accumulation elements 43a, 43b and so on up to 43xx that are arranged in parallel with the photoelectric conversion unit 41 and accumulate the signal electric charges. The barrier gate 44 (44a~44xx) is arranged in parallel with the charge accumulation unit 43 and transfers the signal electric charges accumulated in the charge accumulation unit 43 to the transfer register 45. Reference numbers 45a, 45b, 45c, 45d and so on up to 45xx refer to CCD registers that transfer in sequence the electric charges transferred from the charge accumulation unit 43, and form the transfer registers 45. Reference number 46 refers to an output circuit that outputs the electric charges transferred from the transfer register 45 as a line signal.

Figure 5:
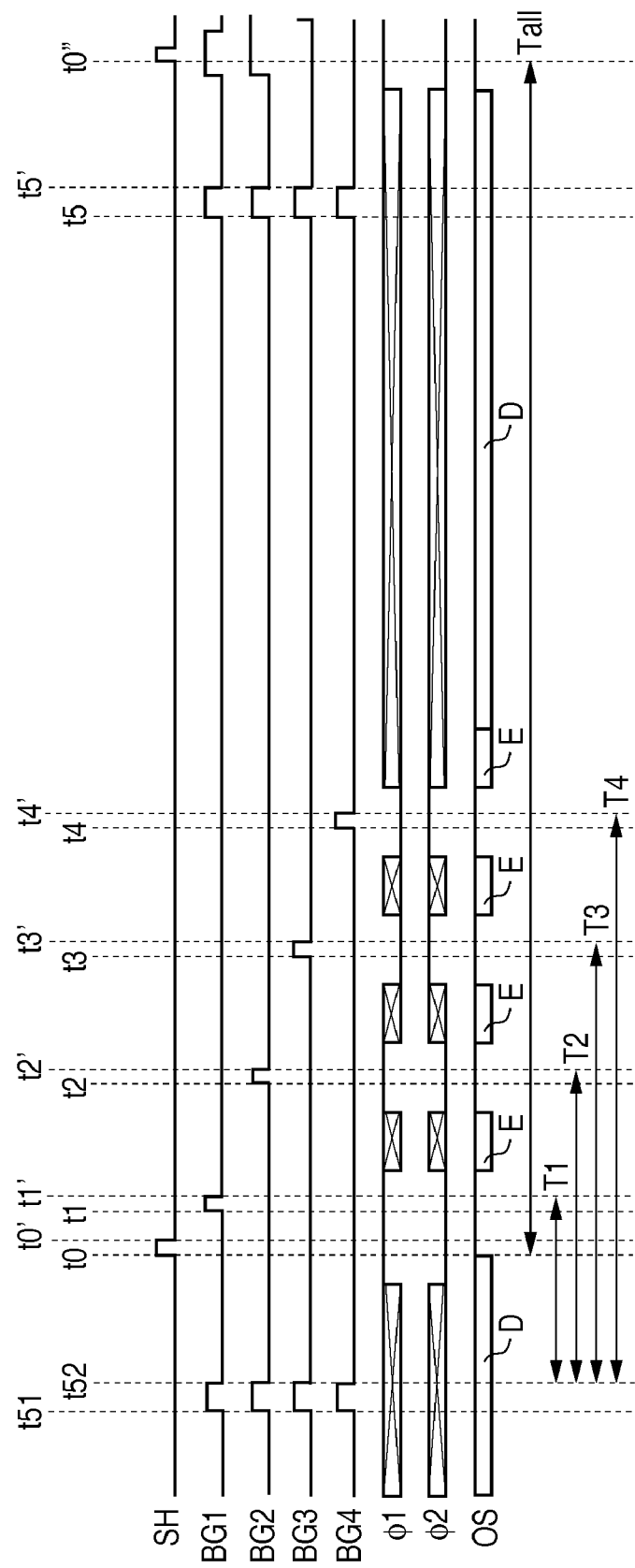
FIG. 5 is a time chart showing an example of the operation of a CCD linear sensor of Embodiment 2.

Here, with reference to the time chart shown in FIG. 5, a method of reducing a dark current noise according to the present embodiment shall be described. All the signal names given in FIG. 5 match the letters indicated in each block shown in FIG. 4, and the signals are applied to respective blocks. OS in FIG. 5 indicates a signal applied to the output circuit that outputs the electric charges transferred from the transfer register 45 as image signals, and indicates that effective pixels are forwarded at times E in the chart.

By setting the transfer gate 42 (SH) to a high (H) level in period t0-t0', the electric charges accumulated in the photoelectric conversion unit 41 of FIG. 4 are transferred to each of the corresponding charge accumulation elements of the charge accumulation unit 43. Since SH is in a L level from t0'to t0", the electric charges generated in the photoelectric conversion unit 41 in this period are all accumulated in the photoelectric conversion unit 41. Moreover, the electric charges transferred to the charge accumulation unit 43 are transferred in sequence to the transfer register 45 in a manner as described below.

First, BG1 is set to a H level in period t1-t1', and thus the electric charges of the charge accumulation elements 43a, 43e and so on corresponding to BG1 of the barrier gate 44 are transferred to the transfer register 45 and then output as signal electric charges. Next, BG2 is set to a H level in period t2-t2', and thus the electric charges of the charge accumulation elements 43b, 43f and so on corresponding to BG2 of the barrier gate 44 is transferred to the transfer register 45 and then output as signal electric charges. Next, BG3 is set to a H level in period t3-t3', and thus the electric charges of the charge accumulation elements 43c, 43g and so on corresponding to BG3 of the barrier gate 44 are transferred to the transfer register 45 and then output as signal electric charges. Next, BG4 is set to a H level in period t4-t4', and thus the electric charges of the charge accumulation elements 43d, 43h and so on corresponding to BG4 of the barrier gate 44 are transferred to the transfer register 45 and then output as signal electric charges.

When ordinary image reading is carried out, images are read by repeating the above-described procedure. In the present embodiment, in period t5-t5', BG1, BG2, BG3 and BG4 are set to a H level. By performing such disposal processing, the electric charges due to all the dark current noise accumulated in the charge accumulation element can be transferred to the transfer register 45. At this time, period t5'-t0" has a sufficient time to allow all the electric charges transferred to the transfer register 45 to be output. The drive of the transfer register 45 may be either stopped or not stopped, and either may be performed as long as a time that is sufficient for the transfer of the electric charges from the charge accumulation unit 43 can be secured.

A time when each charge accumulation element was influenced by dark current noise was substantially identical to the accumulation time Tall for one line when no disposal processing was performed in period t5-t5'. In contrast, when disposal processing was performed, the time can be shortened to T1 in the charge accumulation element of ST1 corresponding to BG1, to T2 in the charge accumulation element of ST2 corresponding to BG2, to T3 in the charge accumulation element of ST3 corresponding to BG3, and to T4 in the charge accumulation element of ST4 corresponding to BG4. The amount of dark current noise is substantially proportional to the accumulation time. Therefore, the disposal processing can be made more effective by setting periods t0'-t1, t1'-t2, t2'-t3, t3'-t4, t52-t1, t52-t2, t52-t3, and t52-t4 to be necessarily sufficient while being as short as possible.

Figure 6:
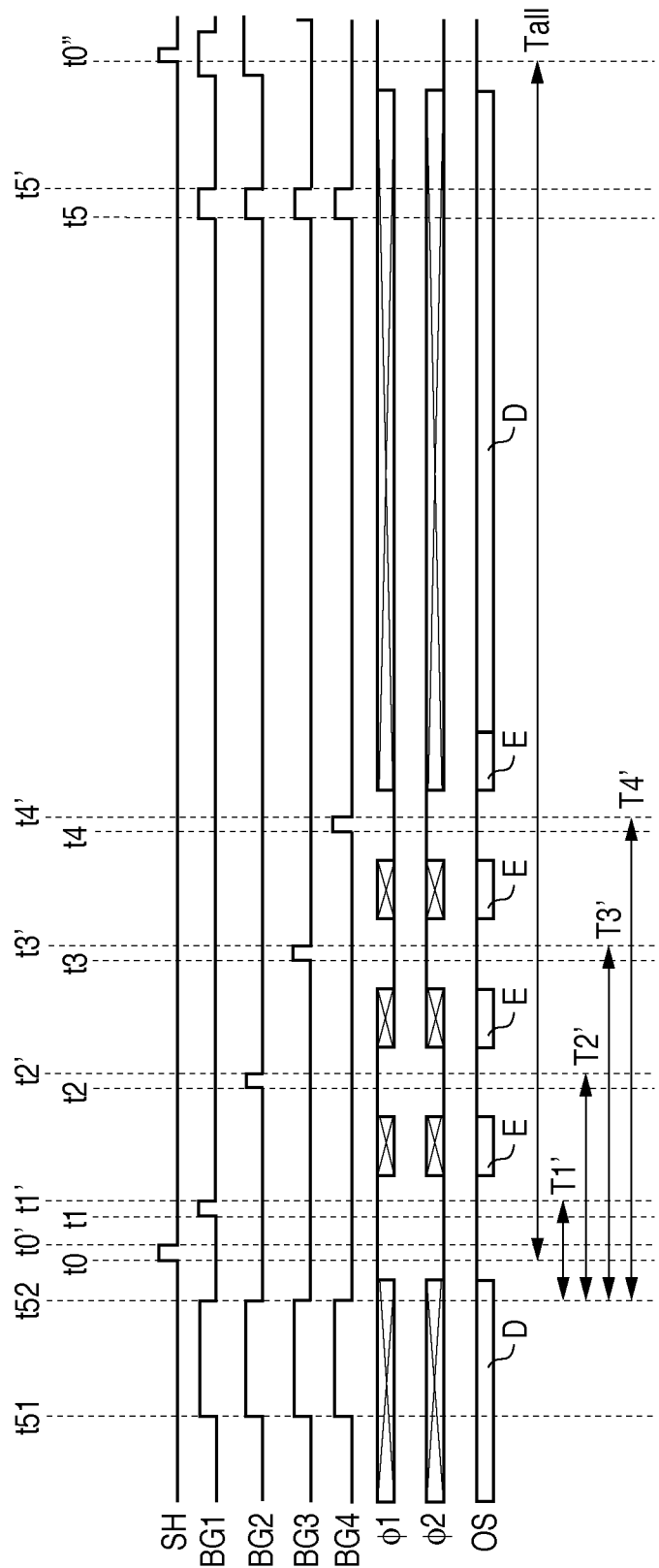
FIG. 6 shows an application example of a time chart showing an example of the operation of a CCD linear sensor of Embodiment 2.
Figure 7:
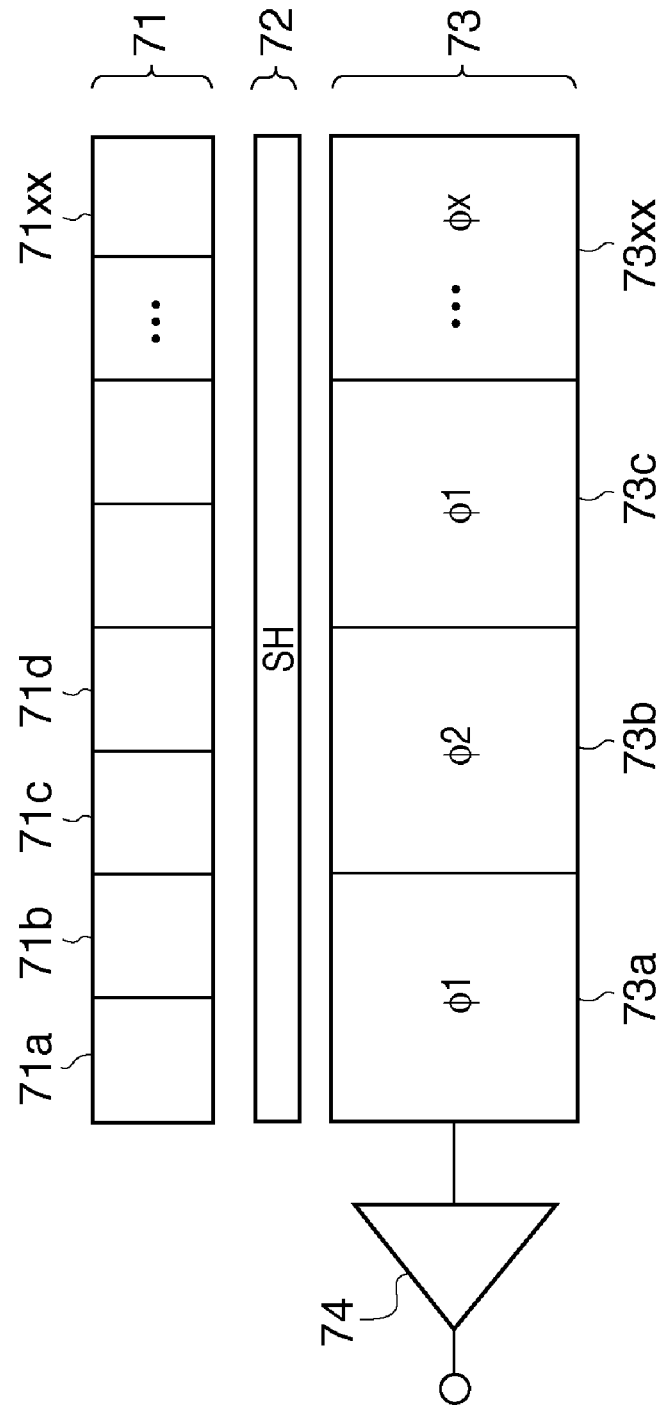
FIG. 7 is a drawing showing a conventional CCD linear sensor.
Figure 8:
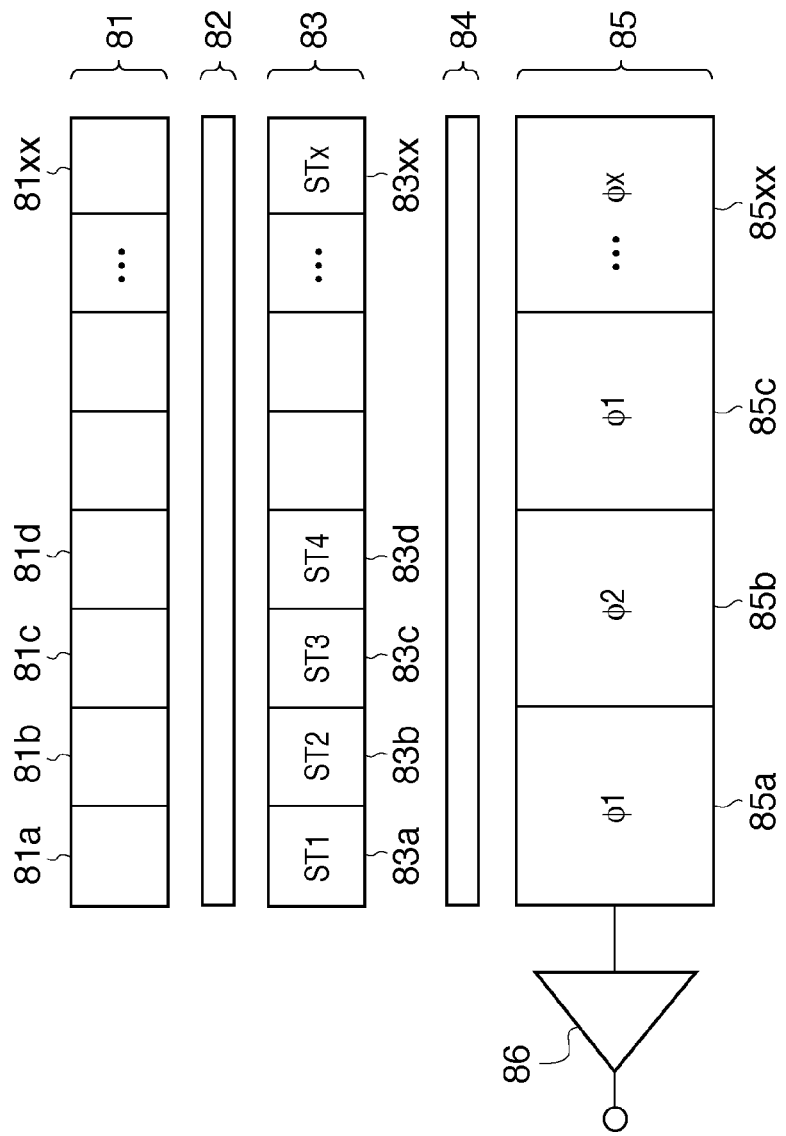
FIG. 8 is a drawing showing a conventional CCD linear sensor.

In the present embodiment, the transfer of the electric charges from the charge accumulation unit 43 to the transfer register 45 is carried out by setting the barrier gate signal to a H level. Therefore, as shown in the time chart of FIG. 6, the fall time of the barrier gate signal for disposal can be set at t52 which is later than t51. As a result, the times when dark current noise influences each charge accumulation element are T1' with respect to the charge accumulation elements corresponding to BG1, T2' with respect to the charge accumulation elements corresponding to BG2, T3' with respect to the charge accumulation elements corresponding to BG3, and T4' with respect to the charge accumulation elements corresponding to BG4. Thus, the time when each charge accumulation element is influenced by dark current noise can be shortened as much as the duration of period t51-t52.

Other Exemplary Embodiments

First Exemplary Embodiment and Second Exemplary Embodiment have been described above, but the present invention is not limited to these embodiments. For example, the number of channels in the barrier gate and the charge accumulation unit may be increased/decreased, and the elements of the transfer register may be shifted as much as ½ or ¼ of an element relative to the elements of the barrier gate. In First Exemplary Embodiment and Second Exemplary Embodiment, by providing a plurality of channels in the barrier gate, a plurality of the charge accumulation elements are divided into a plurality of groups, and thereby the electric charges are removed on a group-by-group basis. The present invention, however, is not limited thereto.

Figure 14:
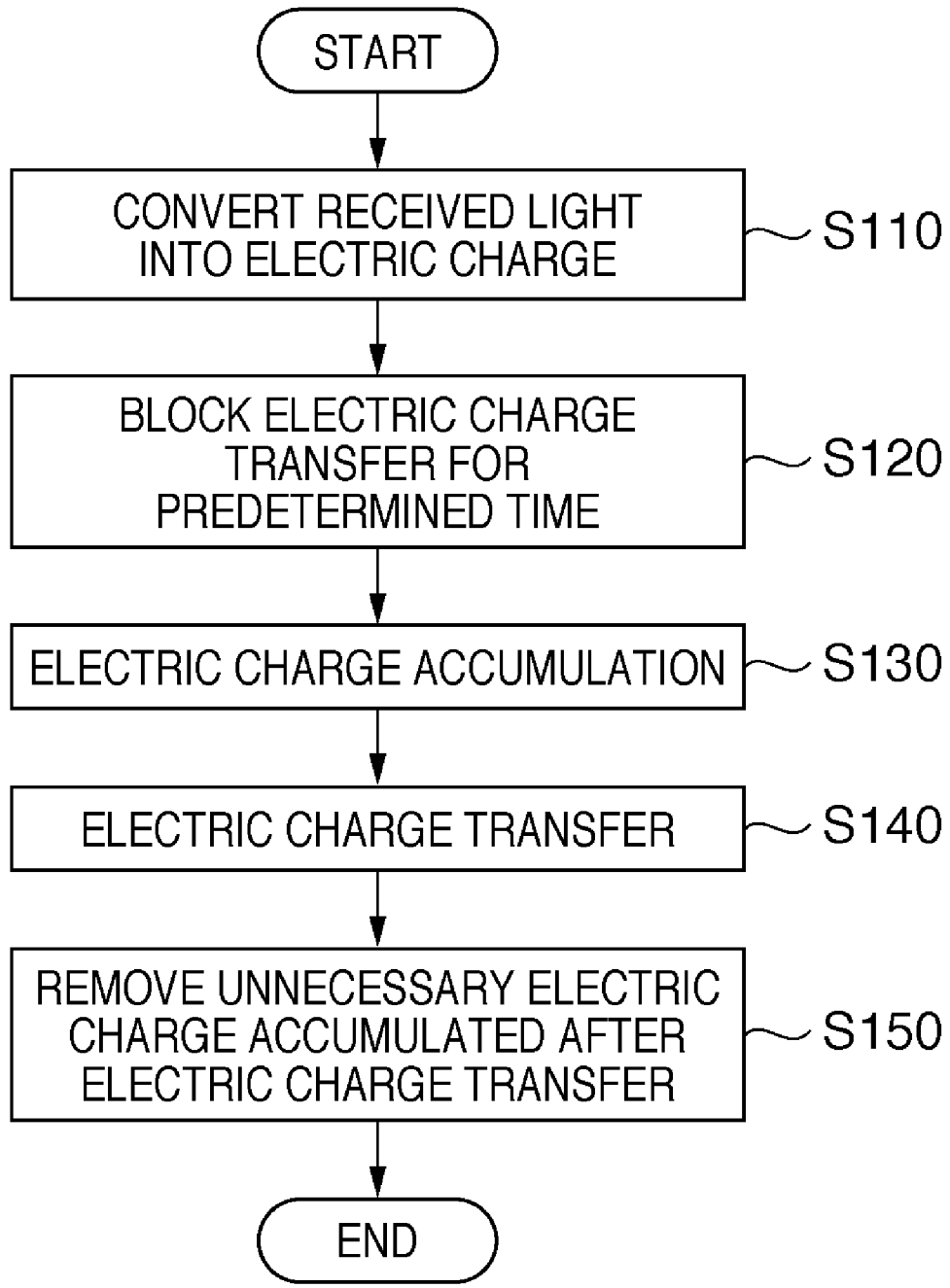
FIG. 14 is a flow chart of a method for reducing a dark current noise of a linear sensor according to a representative embodiment of the present invention.

Furthermore, a flow of a method for reducing a dark current noise of a linear sensor according to a typical embodiment of the present invention shall be described below using FIG. 14.

First, in step S110, the aforementioned light is received and the received light is converted into electric charges in the photoelectric conversion unit. Next, in step S120, the transfer of the electric charges from the photoelectric conversion unit to the charge accumulation unit is blocked for a predetermined period of time by the transfer gate. Next, in step S130, the electric charges converted in step S110 are accumulated in the charge accumulation unit. Next, in step S140, while the photoelectric conversion unit is newly receiving light, the electric charges accumulated in the charge accumulation unit are transferred by the transfer register. Finally, in step S150, while the photoelectric conversion unit is newly receiving light, unnecessary electric charges accumulated in the charge accumulation unit are removed after transferring the electric charges in step S140, and the procedure is terminated.

According to the present invention, unnecessary electric charges accumulated in the charge accumulation unit by dark current noise are disposed of by transferring the unnecessary electric charges within a predetermined period of time, and thus it is possible to reduce any dark current noise including variable dark current noise.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-205850 filed on Aug. 7, 2007, and Japanese Patent Application No. 2008-195317 filed on Jul. 29, 2008 which are hereby incorporated by reference herein in their entirety.

What is claimed is:

1. A method for controlling an image reading apparatus, wherein the image reading apparatus has a memory unit, a photoelectric conversion unit that converts received light into an electric charge, a charge storage unit that includes a plurality of storage regions and stores the electric charge transferred from the photoelectric conversion unit, a transfer unit that transfers the retained electric charge, a first gate unit that is arranged between the photoelectric conversion unit and the charge storage unit, and a second gate unit that is arranged between the charge storage unit and the transfer unit and includes a plurality of gate regions comprising at least a first gate region and a second gate region, each of which corresponds to at least two adjacent storage regions of the charge storage unit, the method comprising:

transferring the electric charge stored in the charge storage unit to the transfer unit via all of gate regions included in the second gate unit;

driving the transfer unit for abandoning the electric charge retained by the transfer unit without accumulation in the memory unit;

transferring the electric charge converted in the photoelectric conversion unit to the charge storage unit via the first gate unit;

transferring the electric charge stored in the charge storage unit to the transfer unit via any one of the first gate region and the second gate region included the second gate unit; and driving the transfer unit for storing the electric charge retained by the transfer unit in the memory unit.

2. The method for controlling the image reading apparatus according to claim 1, wherein the photoelectric conversion unit includes a plurality of photoelectric conversion elements which are arranged in-line, each of the plurality of photoelectric conversion elements corresponds to each of the plurality of storage regions of the charge storage unit respectively.

3. The method for controlling the image reading apparatus according to claim 1, transferring the electric charge stored in the charge storage unit to the transfer unit via the all of gate regions at a predetermined timing and driving the transfer unit for abandoning the electric charge retained by the transfer unit without accumulation in the memory at the predetermined timing.

4. The method for controlling the image reading apparatus according to claim 1, transferring the electric charge stored in the charge storage unit to the transfer unit via the first gate region at a first timing and transferring the electric charge stored in the charge storage unit to the transfer unit via the second gate region at a second timing which is different from the first timing.

5. The method for controlling the image reading apparatus according to claim 1, transferring the electric charge stored in the charge storage unit to the transfer unit via the first gate region at a predetermined timing and transferring the electric charge stored in the charge storage unit to the transfer unit via the second gate region at the predetermined timing.

6. A image reading apparatus comprising:
a memory unit;
a photoelectric conversion unit that converts received light into an electric charge;
a charge storage unit that includes a plurality of storage regions and stores the electric charge transferred from the photoelectric conversion unit;
a transfer unit that transfers the retained electric charge;
a first gate unit that is arranged between the photoelectric conversion unit and the charge storage unit;
a second gate unit that is arranged between the charge storage unit and the transfer unit and includes a plurality of gate regions comprising at least a first gate region and a second gate region, each of which corresponds to at least two adjacent storage regions of the charge storage unit; and
a control unit that performs a first control including transferring the electric charge converted in the photoelectric conversion unit to the charge storage unit via the first gate unit and transferring the electric charge stored in the charge storage unit to the transfer unit via any one of the first gate region and the second gate region included the second gate unit and driving the transfer unit for storing the electric charge retained by the transfer unit in the memory unit, and performs a second control including transferring the electric charge stored in the charge storage unit to the transfer unit via all of gate regions included in the second gate unit and driving the transfer unit for abandoning the electric charge retained by the transfer unit without accumulation in the memory before performing the first control.

7. The image reading apparatus according to claim 6, wherein the photoelectric conversion unit includes a plurality of photoelectric conversion elements which are arranged in-line, each of the plurality of photoelectric conversion elements corresponds to each of the plurality of storage regions of the charge storage respectively.

8. The image reading apparatus according to claim 6, wherein the second control includes transferring the electric charge stored in the charge storage unit to the via the all of gate regions at a predetermined timing and driving the transfer unit for abandoning the electric charge retained by the transfer unit without accumulation in the memory at the predetermined timing.

9. The image reading apparatus according to claim 6, wherein the second control includes transferring the electric charge stored in the charge storage unit to the via the first gate region at a first timing and transferring the electric charge stored in the charge storage unit to the transfer unit via the second gate region at a second timing which is different from the first timing.

10. The image reading apparatus according to claim 6, wherein the second control includes transferring the electric charge stored in the charge storage unit to the transfer unit via the first gate region at a predetermined timing and transferring the electric charge stored in the charge storage unit to the transfer unit via the second gate region at the predetermined timing.

* * * * *